Fig. 2.

INVENTOR
Arnold A. Zachow
BY
ATTORNEYS

Fig. 4

July 21, 1964 A. A. ZACHOW 3,141,426
INCINERATOR
Filed June 5, 1961 10 Sheets-Sheet 6

INVENTOR
Arnold A. Zachow
BY
ATTORNEYS

July 21, 1964 A. A. ZACHOW 3,141,426
INCINERATOR
Filed June 5, 1961 10 Sheets-Sheet 8

Fig. 14.

INVENTOR
Arnold A. Zachow
BY
ATTORNEYS

INVENTOR
Arnold A. Zachow
ATTORNEYS

United States Patent Office 3,141,426
Patented July 21, 1964

3,141,426
INCINERATOR
Arnold A. Zachow, Havertown, Pa., assignor to Module Incinerators, Inc., Philadelphia, Pa., a corporation of Delaware
Filed June 5, 1961, Ser. No. 114,797
15 Claims. (Cl. 110—18)

The present invention relates to incinerators of the type which may be used to consume domestic, commercial and industrial refuse in large tonnage per hour capacities.

A purpose of the invention is to construct an incinerator from module units suitably including prefabricated refractory, so as to facilitate economic erection and replacement of units.

A further purpose is to introduce air tangentially and preferably also slightly downward on the charge from three sides of the main combustion chamber, forming a vortex of air jets which are directed into the piled refuse.

A further purpose is to control the introduction of air under the grates by the density of the smoke.

A further purpose is to construct the foraminated arch of an incinerator from prefabricated refractory arch beam sections which can be installed and replaced readily, and which conveniently include end connecting arch beam units.

A further purpose is to include in the arch beam sections prefabricated lateral projections and notch openings which are to allow passage of flue gases through the arch.

A further purpose is to provide a main incinerator chamber which contains the charge and has at the top a foraminated arch, and directly above the arch to provide an auxiliary combustion chamber having burners. Directly above the auxiliary combustion chamber is a stack which houses a smoke density scanner to scan the density of the smoke evolved, and when the smoke becomes dense to turn on the burners in the auxiliary combustion chamber.

A further purpose is to direct the burners in the auxiliary combustion chamber slightly downwardly over the foraminated arch which separates the main combustion chamber from the auxiliary combustion chamber.

A further purpose is to provide a free floating thermal refractory arch, said arch having auxiliary hangers which carry no load except when the arch is subjected to abnormal deflection.

A further purpose is to provide metallic hangers for certain of the beam connectors, the hangers being free from tension for normal operation of the beams either hot or cold, but functioning during erection of the arch, or when abnormal and particularly off-center loading is applied to the arch for example by engagement by a telephone pole or other large object being burned, or by application of weight from above, for example, incident to repair operations.

A further purpose is to make the refractory arch of refractory beam sections which interconnect end-to-end and which have lateral projections providing openings at the sides.

A further purpose is to deposit the beam sections respectively in righthand and lefthand relation, desirably by providing for opposite engagement in the alternate sockets of the beam connector.

A further purpose is to provide in each group of beams a series of beam sections, the beam sections being connected end-to-end, and abutting on opposite sides of refractory beam connectors, suitably in sockets in the beam connectors.

A further purpose is to provide a repair beam construction consisting of a supporting beam and projections hung from the supporting beam at intervals along its length with spaces in between the projections.

A further purpose is to make up the walls of the incinerator by panels which consist of a metallic frame, a layer of heat insulating material connected to the frame and an inner layer of high temperature refractory next to the layer of heat insulation also connected to the frame, suitably by metallic interlocking elements extending from the frame through the heat insulating layer and embedded in the high temperature refractory layer.

A further purpose when smoke density is excessive is to supply air beneath the grates and thereby reduce the smoke density.

A further purpose is to sense the smoke density by a smoke density sensing device, and whenever the sensing device indicates that the smoke density is excessive, to start a timer. If the smoke density corrects itself before the timer times out the timer ceases to operate and returns to zero and no further action occurs. If however the smoke density is still excessive when the timer times out, the timer starts operation of burners in the secondary combustion chamber.

A further purpose is to carry the flue gases including the fly ash directly upwardly, to turn the flue gas stream through a reverse angle of the order of 150° so as to throw the fly ash downward into a collecting chamber, to conduct the flue gases upwardly at an angle of about 100° to the previous direction, to lead the flue gases across their previous stream and then to lead the flue gases through a baffle system.

A further purpose is to provide a damper arrangement so that the air flow beneath the grates can be increased automatically to permit the forcing of collected ash below the grates into a water washed collecting trough.

Further purposes appear in the specification and in the claims.

In the drawings I have chosen to illustrate only a few of the numerous embodiments in which the invention may appear, selecting the forms shown from the standpoints of convenience in illustration, satisfactory operation and clear demonstration of the principles involved.

FIGURES 21 to 24 illustrate a modification which is used to repair beam sections that fail.

FIGURES 25 to 29 show an alternate construction for the arch.

Describing in illustration but not in limitation and referring to the drawings:

Incinerators of the character which are capable of burning the refuse from a town, city, commercial establishment or industrial plant have heretofore been complicated and expensive in installation and difficult to repair. Because of this it has often been necessary for a municipality or other group to maintain a standby incinerator which could operate when one normally used is not in service.

The present invention is concerned with the design of an incinerator which is simple and inexpensive to install and easy to repair.

One of the features of the incinerator of the invention is that it is manufactured from separate units or modules, which can quickly be put in place and readily replaced.

This is true both of the refractory walls of the incinerator, and also of the incinerator arch.

In the case of the refractory walls, the modules consist of panels having preassembled and preferably precast refractory and heat insulation mounted with a metallic frame which can be assembled into a combustion chamber.

In the case of the roof, refractory beams are provided which have built into them both the lateral projections and the slots or recesses through which the flue gas is to pass. The beams also in the preferred embodiment consist of units or sections which can be assembled together endwise to make the arch.

The incinerator of the invention creates conditions which may be likened to that of a blast furnace. Tuyeres or jets of air are injected into three sides of the charge, preferably in a peripheral or tangential direction, so as to cause a whirling vortex. The air jets are powerful enough so as to penetrate the charge and greatly increase the speed of combustion. The air thus introduced from the sides is supplemented by air coming up from below through the grates on which the charge is supported. Where desired the air introduced from under the grates can be modulated to increase when objectionable smoke is encountered.

The tuyeres or jets in the primary combustion chamber are directed downwardly suitably at an angle of about 15°.

In accordance with the invention there is direct vertical flow of air through a primary combustion chamber and a secondary combustion chamber. In the secondary combustion chamber auxiliary burners are provided which normally are not required to operate. The auxiliary burners however are turned on automatically where a smoke condition is determined by automatic sensing of the combustion gases leaving the stack. A desirable feature of the invention is that time delay is introduced so that the auxiliary burners do not start in operation unless a prolonged deviation from normal operating conditions occurs.

The auxiliary burners are desirably directed at a slight angle downwardly toward the foraminated arch which forms the top of the primary combustion chamber and the bottom of the secondary combustion chamber.

In order to eliminate difficulty through fly ash, fly ash is deposited and collected automatically and automatically transported to a point of disposal. The fly ash is removed by carrying the combustion gases at high velocity suitably of the order of 45 miles per hour, to a point at which a reverse bend downwardly is accomplished, suitably at an angle of 150°. This tends to throw the fly ash under conditions of high momentum into a converging collecting duct and carry the fly ash down the collecting duct. The flue gases make an abrupt turn upwardly and cross the previous stream, the turn suitably being at an angle of 100° and then discharge through a baffle system.

The charging procedure in the device of the invention tends to keep the grate clear as the charge is suitably pushed by a bulldozer onto the grate. This charging technique, combined with the use of a very large door which in the preferred embodiment is at least 20 feet wide and 10 feet high, and the very effective combustion technique described, makes it possible to burn or at least soften articles which are difficult to handle in prior art incinerators such as mattresses, sections of telephone poles, walls and roofs of houses, sections of boats, wharves, docks, trestles, sofas and other large furniture, glass, and truck tires with rims.

In some cases a workman may be employed adjacent to the rear closing doors to introduce a grapple and remove such articles as automobile tire rims, large cans, metal barrels, drums and the like.

During periodic periods of cleaning under the grates, the main air stream through the tuyeres or jets at the sides and back can be cut off or reduced and a great excess of air applied under the grates to blow ash into channels from which it can be removed.

It will of course be understood that the flow of air up through the grate in normal combustion can be modulated or otherwise controlled as desired.

Considering now the drawings in detail, and describing by way of example, it will be evident that the incinerator of the invention is both simple to construct and convenient to operate and repair.

Figure 1:
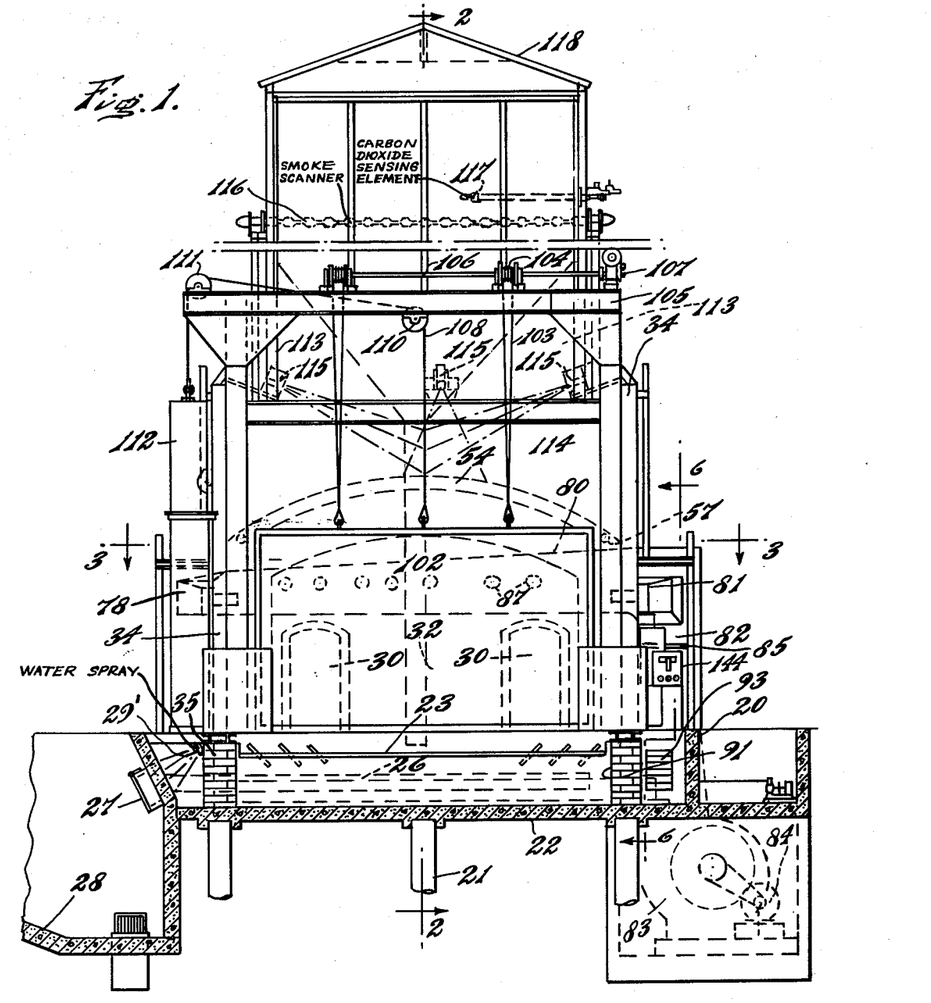
FIGURE 1 is a front elevation of the incinerator of the invention with the ash pits and under grate air control shown partly in vertical section.
Figure 2:
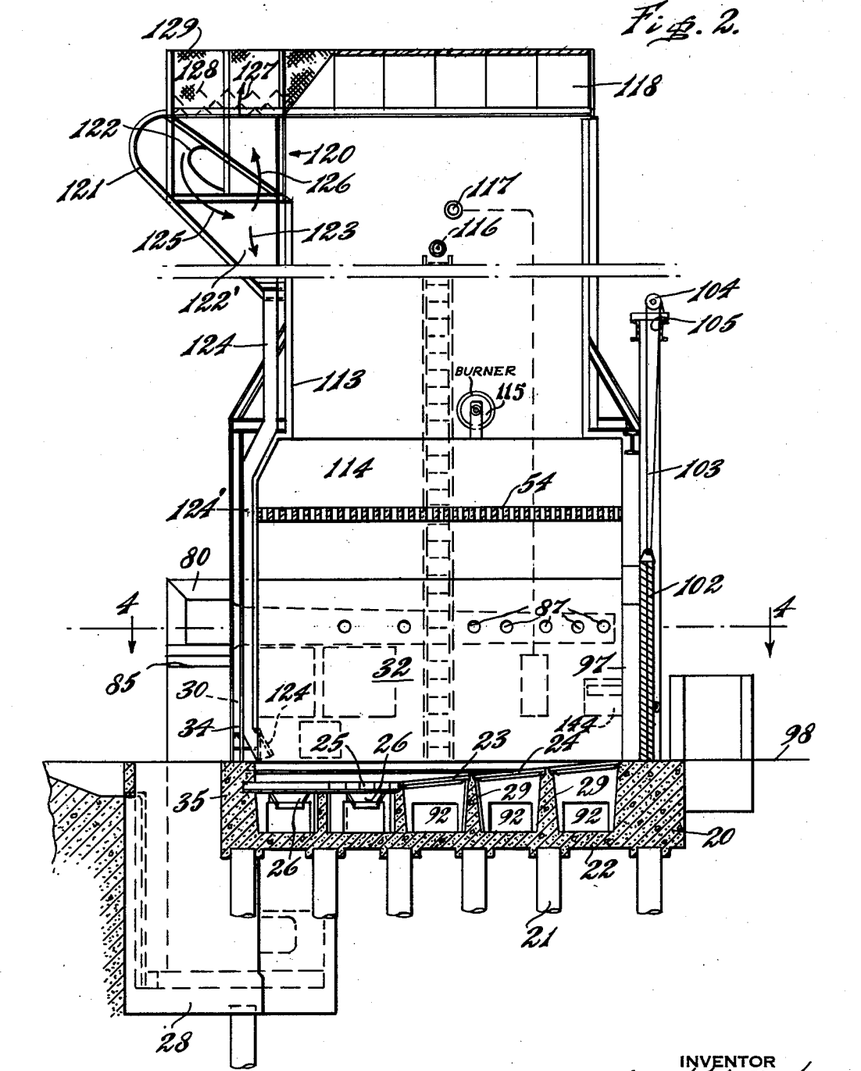
FIGURE 2 is a vertical section of FIGURE 1 on the line 2—2.
Figure 3:
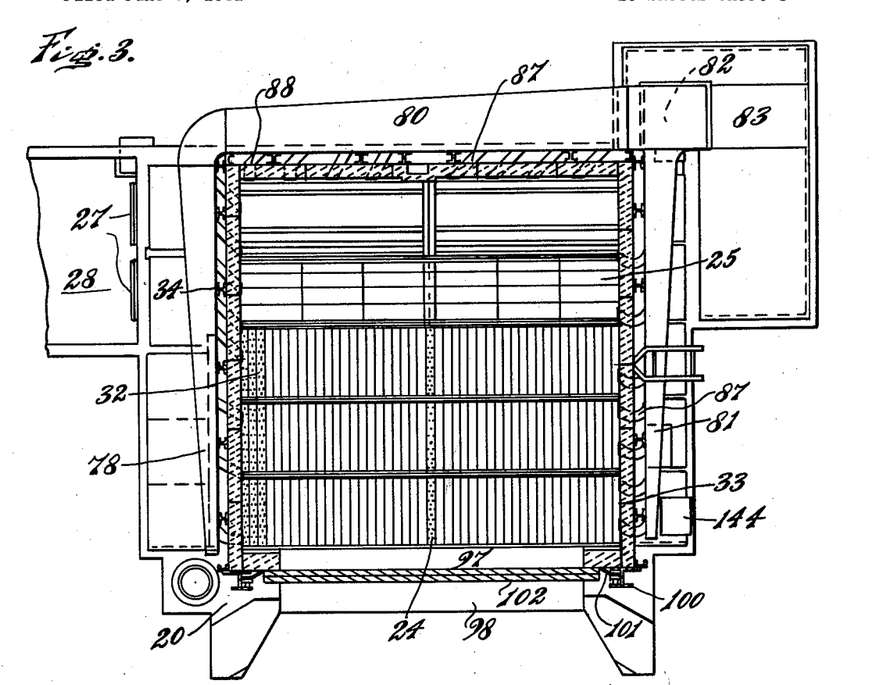
FIGURE 3 is a plan section of FIGURE 1 on the line 3—3.

As best seen in FIGURES 1 to 3, a foundation 20 includes piles 21 which support an ash pit floor 22 from which is mounted a grate 23 consisting of a rearwardly sloping forward portion 24 consisting of spaced pin hole grates subdivided into sections and a generally horizontal rearward portion 25 consisting of transversely spaced shaking grates as best seen in FIGURES 2 and 3, which are mounted above transversely extending ash removing conveyors 26 which discharge through ash doors 27 which suitably open when the front door opens as later described, said ash doors discharging into a suitable truck (not shown) positioned on an ash removal ramp 28 located beneath the ash doors. The ash removing conveyors 26 are duplicated so that one can act as a standby. The grate sections are supported on vertical walls 29 in the ash pit. Water sprays 29' above and adjacent the ash doors 27 operate to quench the ash when the charging door and ash doors open.

Positioned also at the back are walk in doors 30 for handling and removing unconsumed or unconsumable residues. A workman suitably protected by heat resisting clothing is able to utilize a grapple through the doors 30 to eliminate metal, stone and other objects which will not drop through the ash doors 27.

Any ash not carried by the conveyors 26 may suitably be pushed by air blast from the spaces on the floor beneath the conveyors through ash removing doors 27.

The sides and rear of a primary combustion chamber 32 of the incinerator are formed by modules 33, best seen in FIGURES 11 to 16. Any required number of modules will be used. The modules are supported by a metallic frame 34 supported on piers 35.

Figures 12, 13, 15, 16:
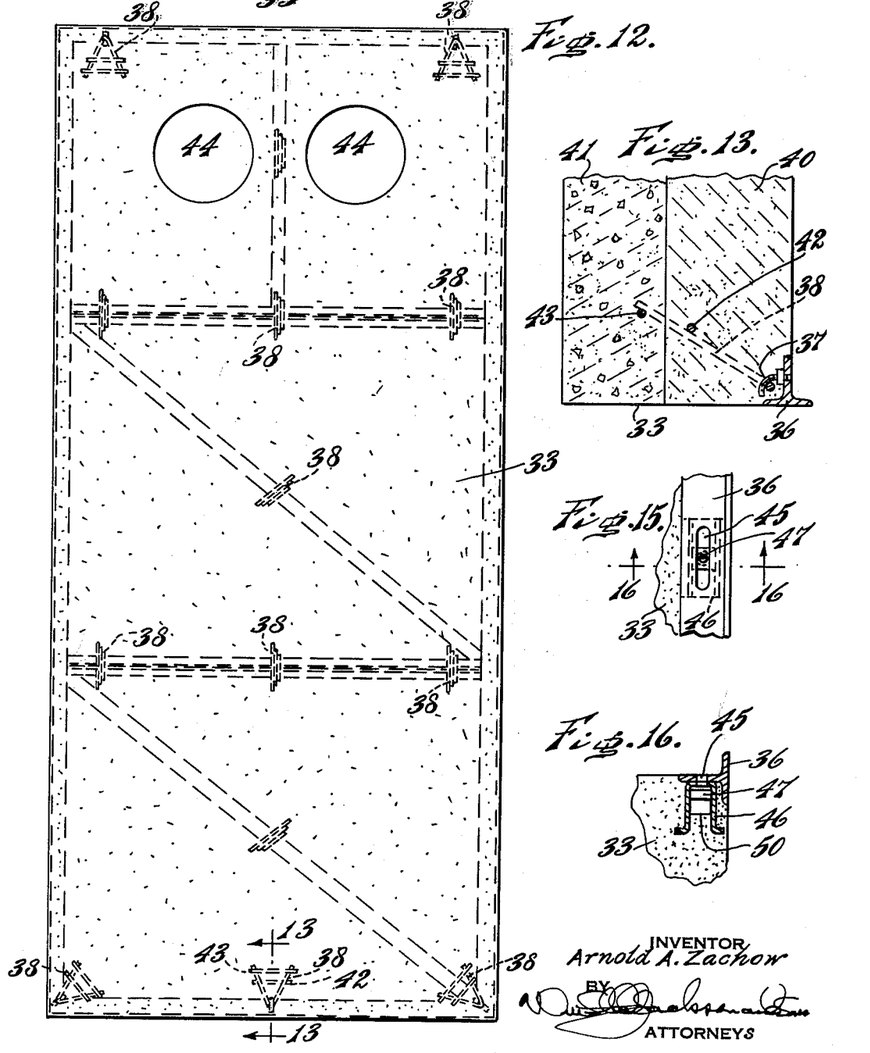
FIGURE 12 is an elevation of the panel shown in FIGURE 11, looking from the hot face.
FIGURE 13 is an enlarged section of FIGURE 12 on the line 13—13
FIGURE 15 is an enlarged fragment of FIGURE 14 omitting the mounting bolt.
FIGURE 16 is a section of FIGURE 15 on the line 16—16.

The refractory modules each suitably includes a metallic frame 36 desirably made up of steel T-bars and cross braces, which have at intervals lugs 37 which anchor in pivotal relation metallic tie loops 38 (suitably of steel) best seen in FIGURES 12 and 13 which are comolded with respect to an outer heat insulating layer 40 suitably of porous magnesia and an inner refractory layer 41 suitably of magnesia, or chrome. A cross bar 42 suitably welded to the loop 38 is anchored in the heat insulating layer 40 and a cross bar 43 also suitably welded to the loop 38 is embedded in the refractory layer 41.

Thus, the refractory and heat insulating layers are prefabricated and bonded to the metallic frame.

At suitable points the refractory and heat insulating layers are provided with openings 44 for the tuyeres.

Figure 11:
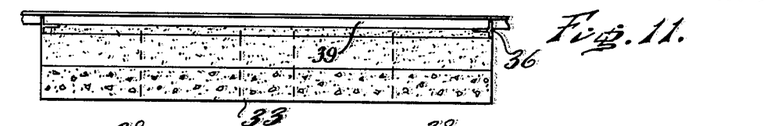
FIGURE 11 is a top plan view of one of the refractory panels used in making up the side walls and the rear wall of the primary combustion chamber of the incinerator.

The frame 36 is mounted in spaced relation as shown at 39 in FIGURE 11 to the metallic structure of the furnace and spacing is assured by the outwardly extending flanges of the T-bars (FIGURE 13).

Figure 14:
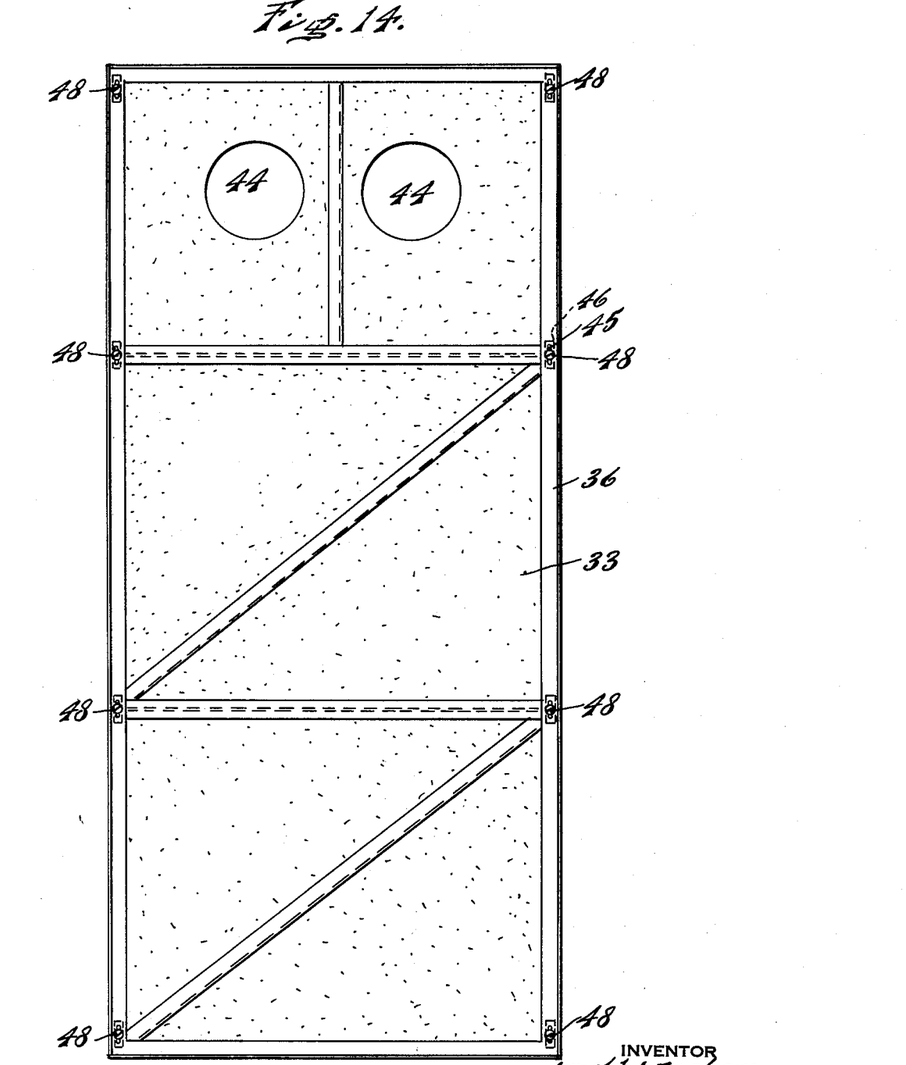
FIGURE 14 is a rear elevation of the module of FIGURE 12.

A convenient form of anchorage is shown in FIGURES 15 and 16, in which a slot 45 is cut in one of the T-bars of the frame and buried in the refractory behind the slot is a channel member 46 suitably united to the frame as by welding and having a nut 47 slidable in the space within the channel member and adapted to receive a fastening bolt 48 as shown in FIGURE 14. The protection against filling the opening within the space of the channel member is provided as by a welded closure 50 at the back of the channel member.

The roof of the primary combustion chamber 32 (FIGURE 2) comprises a foraminated arch 54 which consists of refractory beams 55 (FIGURE 18) made up of separate refractory beam sections 56 which are supported on skewbacks 57 mounted on the side steel structure 34.

Figures 17, 18, 19, 20:
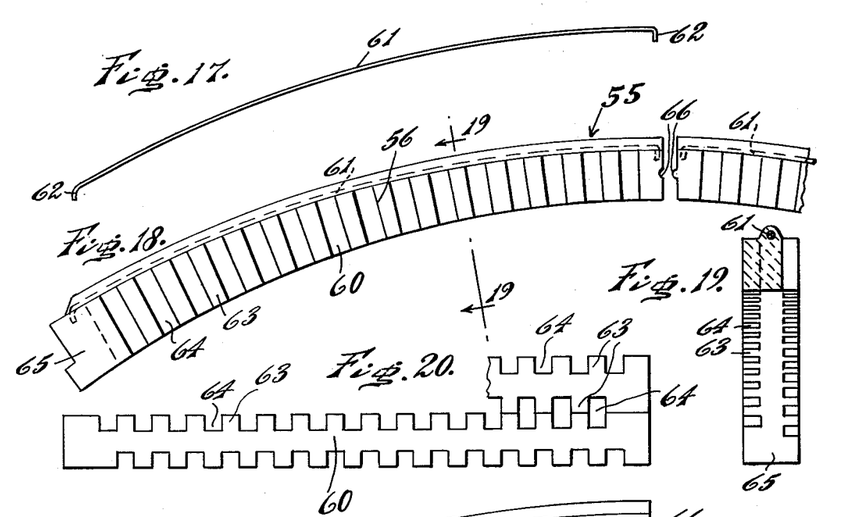
FIGURE 17 is a side elevation of the metal reinforcement used in one of the panel sections of FIGURE 18.
FIGURE 18 is a side elevation partly pulled apart of one beam section and a portion of an adjoining beam section which are to be connected end-to-end.
FIGURE 19 is a section on the line 19—19 of FIGURE 18.
FIGURE 20 is a fragmentary bottom plan view of FIGURE 18 showing one beam section and a portion of the laterally adjoining beam section, but omitting the longitudinally adjoining beam sections.

In the form as shown in FIGURES 17 to 20, each of the refractory beam sections 56 is of premolded form suitably of basic refractory such as magnesia, chrome, chrome-magnesia or magnesia-chrome, and suitably of unfired character prior to insertion in the furnace. The refractory beam consists of a refractory body portion 60 which has comolded with it near the cold end (remote from the primary combustion chamber) a metallic bar 61 suitably of steel having bent over portions 62 at the opposite ends. Comolded with the body portion 60 and extending laterally in staggered relation are lateral projections 63 somewhat like teeth on a gear which have spaces 64 between them. When two beam sections are placed side-by-side as shown in FIGURE 20, the openings 64 line up and the projections 63 are in abutting relation, so that flue gases can pass upward through the openings but large solid material such as airborne refuse undergoing combustion will be trapped in the primary combustion chamber.

The beam sections which adjoin the skewbacks are conveniently formed as at 65 to fit the skewbacks and the beam sections which adjoin other beam sections have at the ends tongue and groove connections 66 as best seen in FIGURE 18.

When an individual beam section fails in service, an emergency repair can be made without shutting down the incinerator for any prolonged period of time using the structure of FIGURES 21 to 24, inclusive. In this structure a narrow refractory beam section 60' corresponding to the body of the refractory beam section previously described and having a reinforcing bar 61 comolded in the interior near the cold end, is inserted in place from the top by moving the longitudinal adjoining beam section radially outwardly and then moving both beam sections downwardly together.

Figures 21, 22, 23, 24:
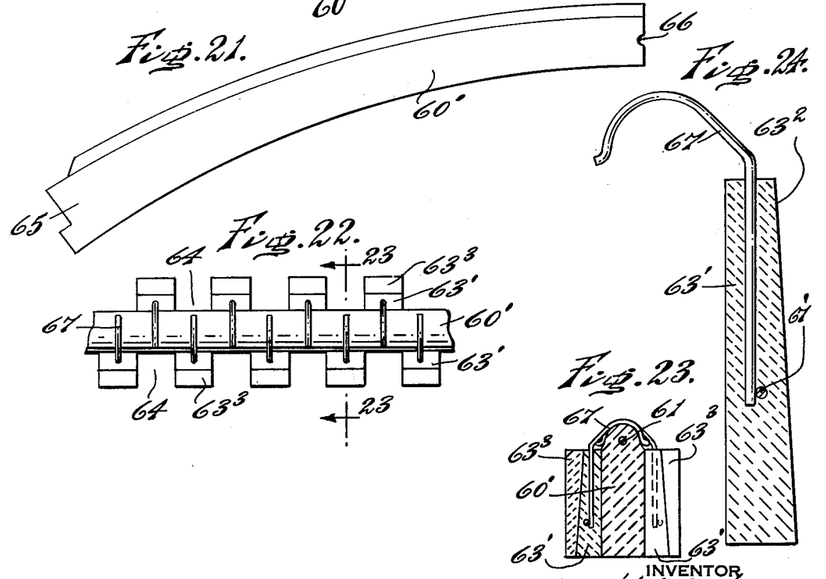
FIGURE 21 is a side elevation of one repair beam support section.
FIGURE 22 is a fragmentary top plan view showing the repair beam section of FIGURE 21 with a series of attached repair projection units and wedges.
FIGURE 23 is a section of FIGURE 22 on the line 23—23.
FIGURE 24 is an enlarged central vertical section of one of the repair projection units of FIGURES 22 and 23.

Projections 63' are then hung on the beam section 60' at spaced intervals to leave spacing 64 and to place the projections in staggered relation as best seen in FIGURES 22, 23 and 24. The projections have metallic hangers 67 comolded therein and desirably having also comolded and welded to the hangers 67 transverse projections 67'. Hook ends of the hangers 67 rest on the beam 60'.

The projections 63' desirably do not extend out far enough to engage the projections 63 on the adjoining beam section, but have wedge surfaces $63^2$ which receive between the removable projections 63' and the adjoining projections 63 of the next beam section, wedge projection elements $63^3$ as best seen in FIGURES 22 to 24.

Figure 25:
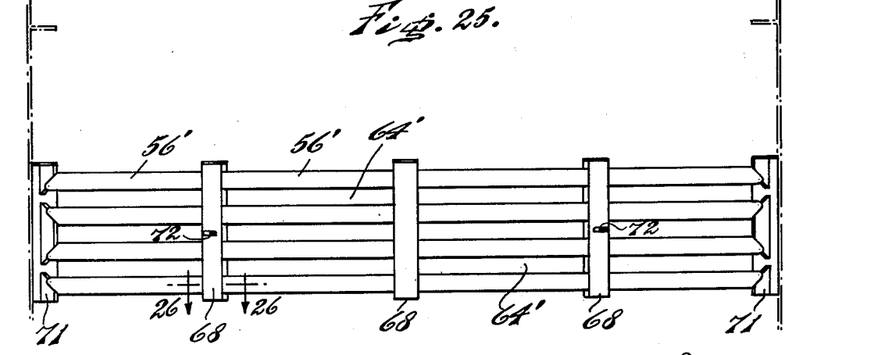
FIGURE 25 is a fragmentary top plan view showing one group of laterally associated beams each made up of several beam sections. It will be understood that this is adjoining but not laterally connected to a similar group of beams at both sides except at the very ends.
Figures 26, 27, 28:
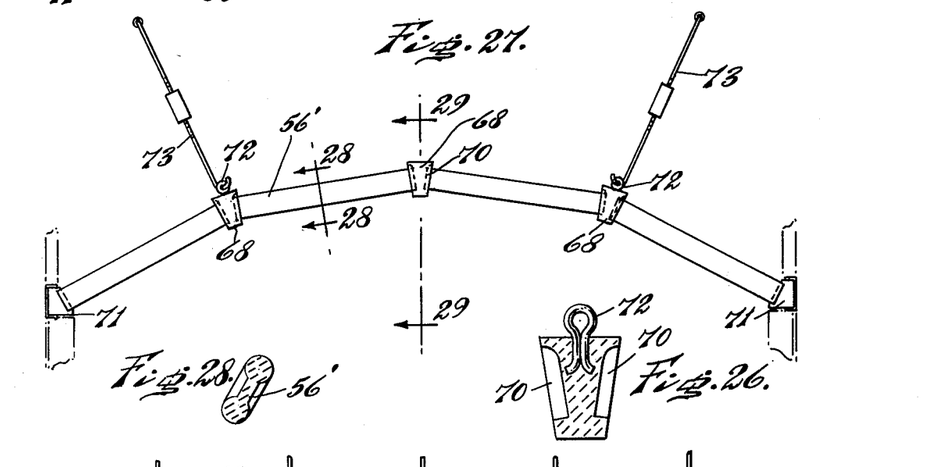
FIGURE 26 is an enlarged section on the line 26—26 of FIGURE 25 showing only the keystone connector.
FIGURE 27 is a side elevation of the beams of FIGURE 25.
FIGURE 28 is an enlarged section on the line 28—28 of FIGURE 27 showing only one beam section.
Figure 29:
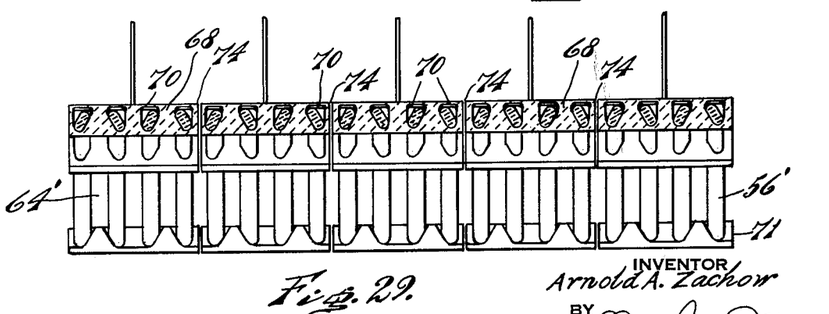
FIGURE 29 is an enlarged section on the line 29—29 of FIGURE 27 showing several keystone connectors and several groups of beams disposed laterally.

While the form of FIGURES 17 to 20 suitably with the repair device of FIGURES 21 to 24 can be used very effectively, the preferred refractory beam system is that of FIGURES 25 to 29. In this form of the invention, refractory beam sections 56' are arranged side-by-side in sets, suitably four beam sections together with spaces 64' interposed laterally between each beam section and the next. At the end of each group of beams (suitably four) and interposed between the longitudinal ends of that group of beam sections and the next, is placed a refractory keystone connector 68 which has in line with each beam on each side a beam receiving socket 70 as best seen in FIGURES 26, 27 and 29. The beams 56' at the ends are suitably of generally rectangular shape and intermediate the ends are suitably of dumbbell formation as shown in FIGURE 28 and the sockets 70 are desirably alternately inclined lefthand and righthand so that the beams can be alternately inclined lefthand and righthand as best seen in FIGURE 29.

Of course, the question of whether four beam sections make up a complete beam as shown in FIGURE 27, or some other number is used, is not critical in the invention, but it is important to provide enough beam sections longitudinally so that an individual section can be replaced by raising the beam sections.

All of the refractories of the beams and connections will preferably be magnesia, chrome, chrome-magnesia or magnesia-chrome.

Just as the keystone connectors have opposite sockets in FIGURES 25 to 29, so the skewbacks 71 are provided with opposite sockets to hold the oppositely inclined beams as shown in FIGURES 25 and 29.

The intention is that the arch of FIGURES 25 to 29 will be entirely free floating, without support from above of the individual beam sections except at the ends during normal operation. It is, however, desirable to provide for the problem of erection and also for the problem of repair when personnel may desire to walk on the arch or to rest equipment on the arch. For this purpose the outboard beam connectors 68 are provided with comolded metallic eyes 72 as best seen in FIGURES 26 and 27 which receive adjustable metallic hangers 73 supported from the metallic frame, the hangers being sufficiently loose in their adjustment so that when the beam is fully erected and is not subjected to localized load from above, no tension will be applied by the hangers to the key connectors or the arch, but when a beam section or sections break, or when something abnormal occurs, as for example striking of the arch from below by a telephone pole in the incinerator, or repair conditions with personnel or equipment resting on the arch from above, then the hanger 73 will prevent the outboard key connectors 68 from dropping beyond a predetermined distance.

One of the great advantages of the form of FIGURES 25 to 29 is that each individual group of beams and each individual key connector is separated from the adjoining group and behaves entirely independently from the standpoint of response to load and expansion and contraction. Separations are shown at 74 along the arch in FIGURE 29.

The primary combustion chamber 32 (FIGURE 1) is surrounded at the sides and the rear by air manifolds 78, 80 and 81 which communicate with an up-take 82 from a blower 83 driven by a pulley and belt combination from an electric motor 84. A damper 85 is interposed between the blower and the manifolds. Deflecting vanes 86 and 86' (FIGURE 4) are provided where the air changes direction.

Figure 4:
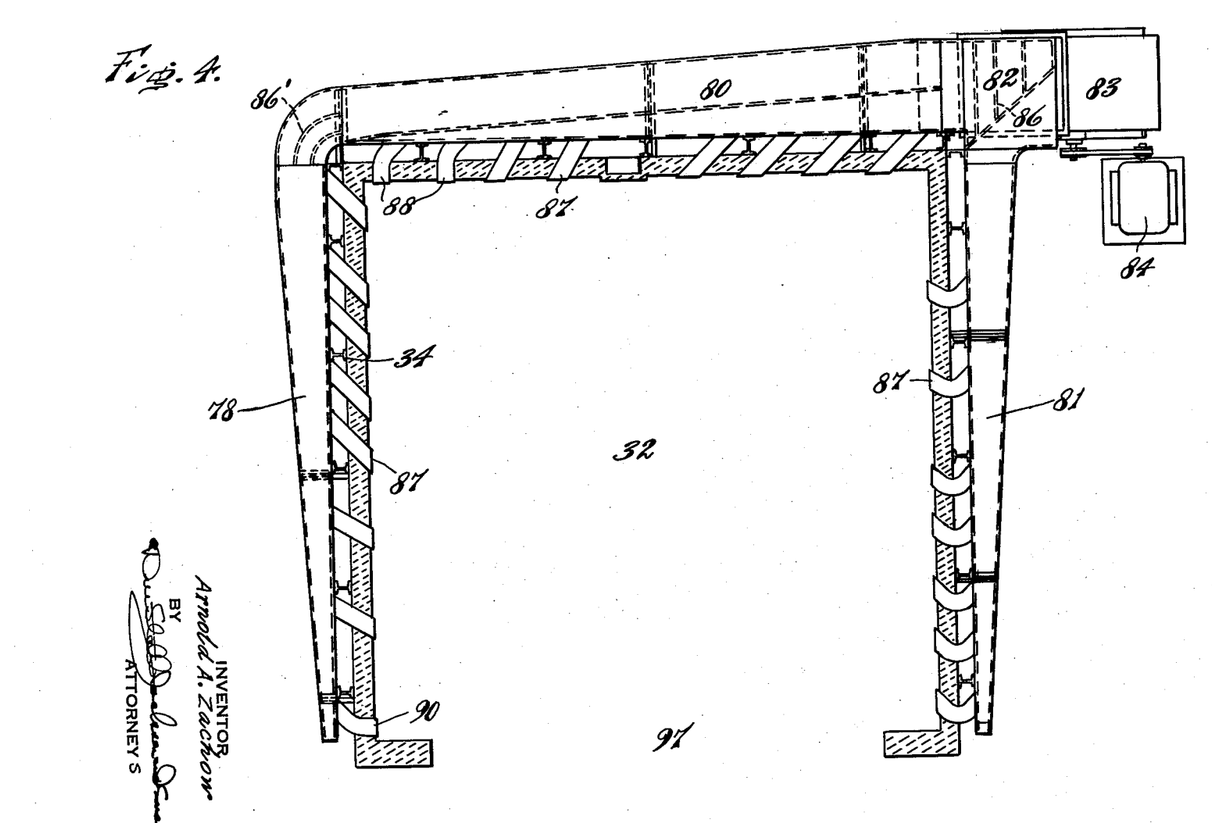
FIGURE 4 is a plan section of FIGURE 2 on the line 4—4, omitting structure below.
Figures 5, 6:
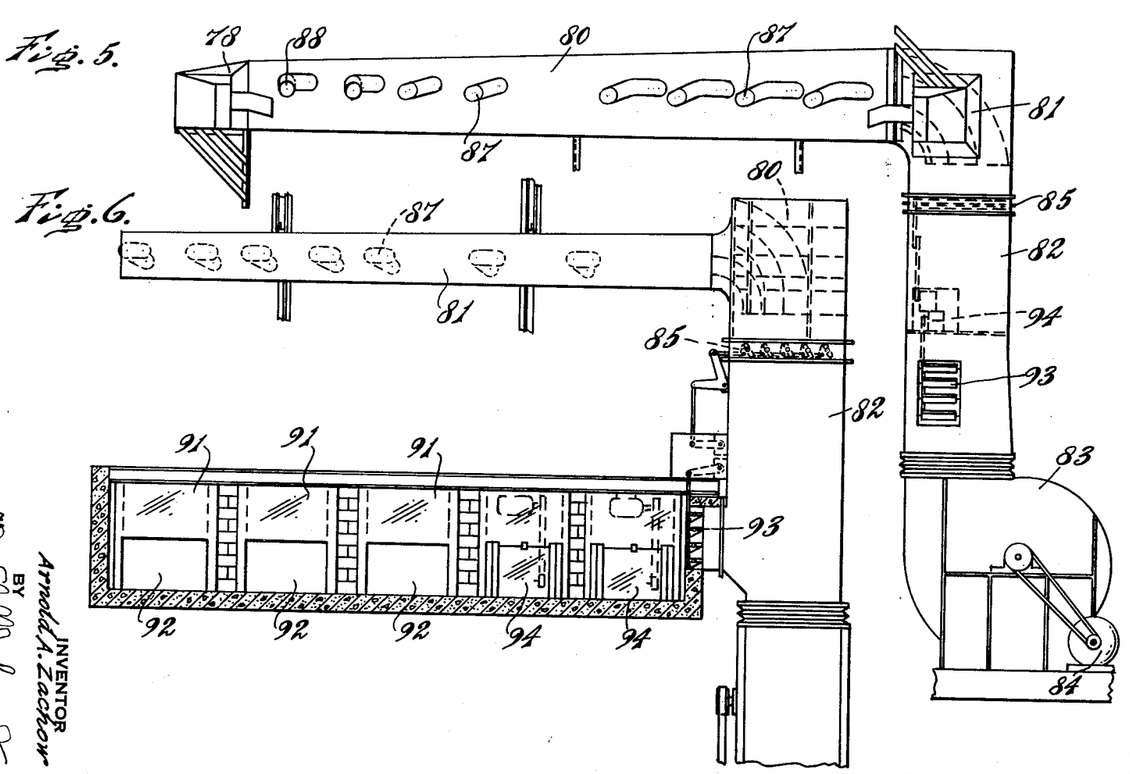
FIGURE 5 is a fragmentary front elevation of the air manifold which distributes air to the three sides of the incinerator.
FIGURE 6 is a fragmentary side elevation of the manifolds which distribute air to the right side of the incinerator as viewed in FIGURE 3, partly in section on the line 6—6 of FIGURE 1.

Each of the manifolds has a series of ports or tuyeres 87 which as best seen in FIGURES 3 and 4 extend through the refractory modules and are directed, except in the case of tuyeres 88 at one end of the back and tuyere 90 at the front of one side, into a generally tangential or peripheral direction with respect to the charge so as to set up a whirling vortex in combustion chamber 32. The tuyeres also as shown in FIGURES 5 and 6 are directed slightly downwardly suitably at an angle of the order of 15° below the horizontal, and since a very large air flow is contemplated of the order of 55,000 cubic feet per minute in a 15 ton per hour incinerator, the effect of the air is to penetrate the charge which is placed near the center of the primary combustion chamber, and which may rise to a height of the order of the height of the front door. The tuyeres are desirably located approximately 8 feet above the grate 23 in the preferred embodiment.

The up-take 82 (FIGURE 6) desirably connects also to a concrete trough 91 which extends along one side of the incinerator beneath the grate and communicates with the space beneath the grate by a series of openings 92. Entry of air to the channel 91 is controlled by damper 93. In front of the conveyors 26 there are doors 94 which can be opened along with opening of the damper 93 to blow ash out from under the conveyors and through the ash doors 27. Damper 93 can be regulated by a smoke scanner as later explained.

One of the great advantages of the device of the invention is that it permits the provision of a very wide door opening of at least 20 feet in width as shown at 97 (FIGURE 2) so that charging can be accomplished of relatively large objects such as mattresses, sections of telephone poles, sofas, window frames, truck tires with rims, small houses, and sections of wharves, docks and trestles, by simply pushing the material in over the front apron 98 by means of a bulldozer, front loader or the like. At the vertical sides of the door openings, guideways 100 suitably guide projections 101 from a refractory lined door 102 which is supported by cables 103 wound over hoisting drums 104 on a door supported superstructure 105, and driven by shaft 106 connected to motor and speed reducer 107.

A suitable cable 108 passing over pulleys 110 and 111 on the superstructure 105 carries a counterweight 112, suitably located at one side.

The door operation is suitably coordinated so that when the front door 102 opens, the rear fly ash door $124^4$ and the ash doors 27 open and when the door 102 closes these other doors also close.

Figures 30, 31:
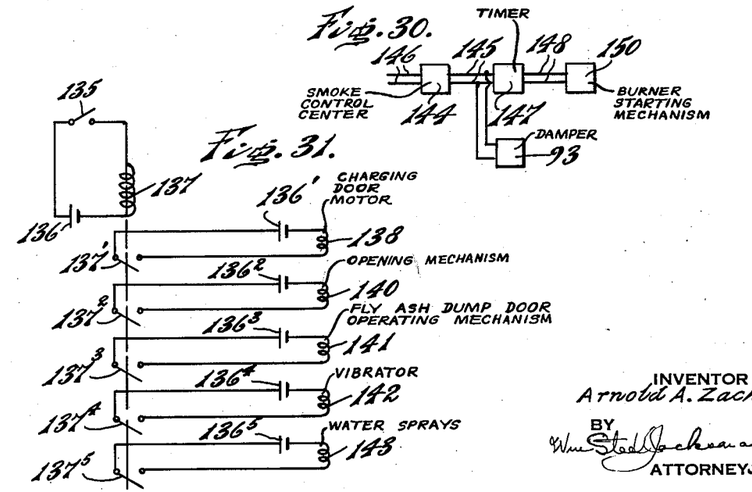
FIGURE 30 is a block diagram useful in explaining the operation of the burners.
FIGURE 31 is a circuit diagram showing the door operating mechanism.

I illustrate in FIGURE 31 diagrammatically a suitable arrangement for control of the doors in unison. In this form a suitable door control switch 135 in circuit with the power source 136 and a gang relay 137 when energized closes relay contacts 137', $137^2$, $137^3$, $137^4$, and $137^5$.

Relay contact 137' is in circuit with power source 136' and starter relay 138 of main charging door motor 107. Contacts $137^2$ are in series with power source $136^2$ and starting relay 140 of the opening mechanism (which may be a conventional door opening motor as well known) for ash door 27. Relay contacts $137^3$ are in series with power source $136^3$ and starting relay 141 of the door operating mechanism of the fly ash dump door $124^4$ (of any conventional well known door opener).

Figures 7, 8, 9, 10:
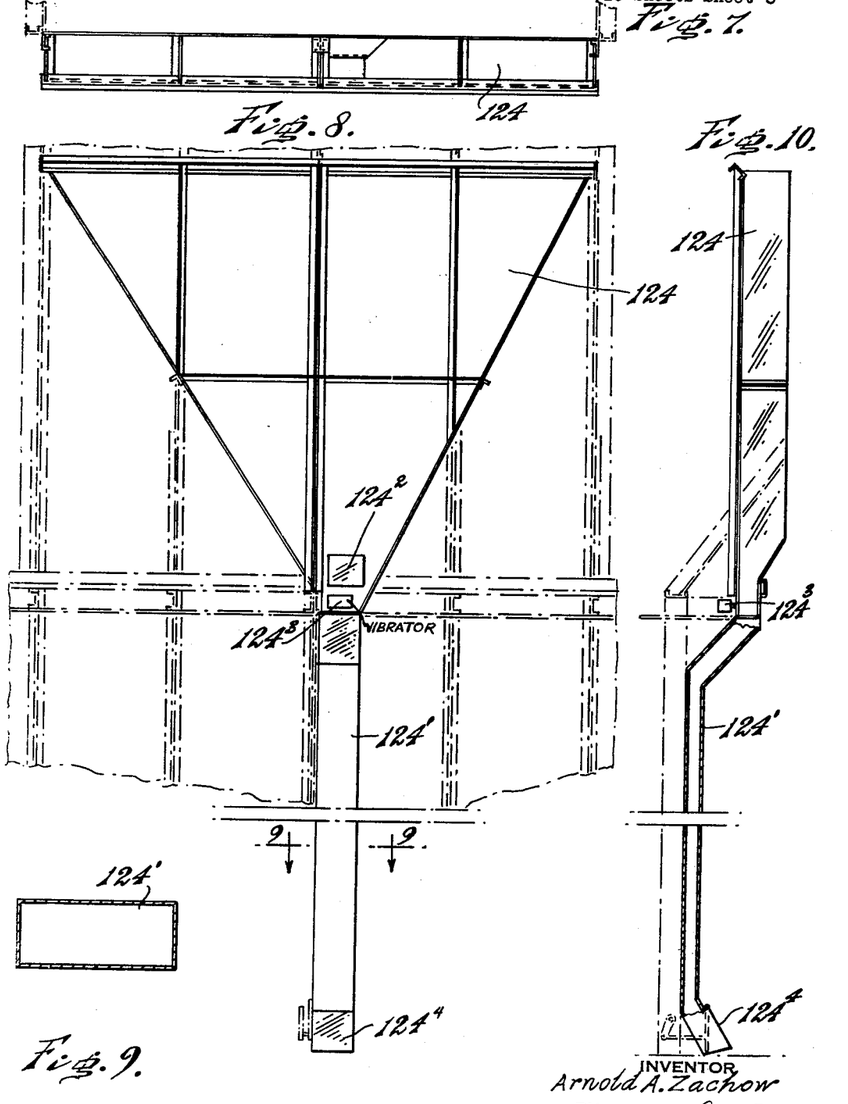
FIGURE 7 is a top plan view of a fly ash hopper and return duct.
FIGURE 8 is a rear elevation of the fly ash return hopper and duct as seen in FIGURE 7, with the surrounding structure partially broken away.
FIGURE 9 is an enlarged section of the lower portion of the duct on the line 9—9 of FIGURE 8.
FIGURE 10 is a side elevation of the fly ash return hopper and duct of FIGURE 8, partially broken away.

Relay contacts $137^4$ in series with power source $136^4$ and starting relay 142 operate vibrator $124^3$ (FIGURES 8 and 10). Relay contacts $137^5$ in series with power source $136^5$ operate solenoid valve 143 which turns on water sprays 29' to quench the ash as it passes out the ash doors 27.

Above the arch 54 the furnace narrows to form stack 113 and extends vertically upwardly. The space above arch 54 and below the stack forms a secondary combustion chamber 114.

Positioned in the secondary combustion chamber at either side, located above the arch and directed slightly downwardly on the arch preferably at an angle of about 20° to the horizontal, are secondary burners 115 which are normally not operating, but are turned on in response to scanning of dense smoke by a smoke scanner 116. A carbon dioxide sensing element 117 suitably turns on an alarm when carbon dioxide exceeds an acceptable level, for example in the range between 12 and 20% by volume.

From the secondary combustion chamber, the gases are unable to escape vertically upwardly because the roof 118 immediately above the secondary combustion chamber is closed, but are carried to the rear as best seen in FIGURE 2, to enter rearwardly extending horizontal flue 120, and pass downwardly in a reverse bend of approximately 150° between outer curving guiding sheet 121 and inner curved guiding sheet 122. The tendency due to the high velocity of the gases at arrow 125, which are moving at a speed in excess of 20 miles an hour, for example 45 miles per hour, is to deposit fly ash downward into hopper 122' as indicated by arrow 123 at a high velocity, so that the fly ash is carried by the converging walls into downwardly extending fly ash duct 124 best seen in FIGURES 2, 7, 8 and 10, which converges into duct 124' discharging into ash conveyor 26. An access door $124^2$ is provided near the bottom of duct 124', and a vibrator $124^3$ operates at that point to shake down the ash every time the charging door opens. A fly ash discharge door $124^4$ is located at the bottom of the duct 124'. As the flue gases make the abrupt reverse turn and deposit the fly ash downwardly, they move upwardly as shown by arrow 126, crossing the rearward gas stream in flue 120 and passing upwardly as indicated by arrow 127 between baffles 128 which extend across the top of the flue 120. The combustion gas thus passes to the atmosphere through a suitable screen 129. The baffles 128 desirably partially overlap one another vertically and may conveniently consist of inverted metallic angles.

In operation, it will be evident that the incinerator of the invention can be assembled very quickly by erecting the steel supporting structure and the duct work and assembling the refractory wall sections as modules. The arch is erected by joining the prefabricated arch beams from beam units interconnected end-to-end in a tongue and groove fashion. The length and width of the incinerator can readily be changed by introducing more or fewer modules and by modifying the number of beam units and the length of the beam units as desired.

Once the incinerator is assembled, the refractory is heated slowly, suitably by introducing an oil burner or the like, until it reaches and maintains for the order of a day a temperature of 1800° F.

During periods of inactivity the refractory should not be allowed to cool to room temperature, and either a small incinerator fire should be maintained or else an oil burner or the like should be introduced to maintain the desired standby temperature.

Once a refractory has been brought up to temperature and maintained at a suitable temperature so as to dry it, the incinerator may be charged and placed in operation, suitably opening the charging door and pushing in a charge and lighting as by a torch. In repeatedly charging the incinerator, a suitable mixture or blend of wet and dry material will preferably be used, as well known in the art.

As soon as the charging door is closed, the blower will operate so as to introduce not in excess of one-quarter of the total air beneath the grates, and the balance of the air will be introduced into the primary combustion chamber by the tuyeres in the form of a peripheral or tangential vortex suitably at an angle slightly below the horizontal so that the air will tend to penetrate the charge and produce a swirl which will promote very effective incineration. In the incinerator of the invention where the charging door is of the order of 20 feet wide and 10 feet high and the incinerator depth is of the order of 20 feet, a total quantity of blown air of the order of 55,000 c.f.m. is indicated to produce incineration at a rate of 15 tons per hour.

The air comes in on both sides and from the rear, and thus is very effectively distributed.

Each time the ash discharge doors are open, ash is discharged into a dump truck or the like and also an operator using a grapple through rear walk in doors 30 will be enabled to remove material which would otherwise obstruct operation, such as heavy iron and steel members, steel barrels, and large or heavy pieces of concrete. Due to the fact that no travelling grate is used, there will be no tendency of such articles to jam and the pushing in of the charge by the bulldozer or the like tends to scrape and clean the surface of the grates.

During normal weather conditions, and normal operation, the combustion gases will pass vertically upward through the secondary combustion chamber without the need for any auxiliary burning. When, however, the density of the smoke as scanned by smoke scanning device 116 indicates a smoke density in excess of Ringelman No. 1, or whatever density is required, then the automatic mechanism turns on auxiliary burners 115 in the secondary combustion chamber. The smoke density is thus maintained near Ringelman No. 1.

Since there may be slight variations in smoke density due to localized conditions, a time delay relay is interposed in the system between the smoke density control and the secondary burners so that the smoke density must be excessive for an appreciable length of time, say two minutes, before the secondary burners will be turned on.

The mechanism by which smoke scanning is made effective suitably comprises a smoke control center 144 of any well known character which when smoke density exceeds a predetermined value closes a circuit (FIGURE 30) through output leads 145 from a suitable power source 146, to a timer 147 of well known character which when it times out, closes the circuit 148 to burner starting mechanism 150 for burners 115. When the circuit in output leads 145 closes, this also closes the operating control to damper 93 (suitably a solenoid valve) to open damper 93 and introduce extra air beneath the grates. Timer 147 is of a character well known in the art (made for example by Automatic Timing and Controls, Inc.), which if the circuit 145 is interrupted by the cessation of the excessive smoke condition determined by smoke control center 144, the timer will automatically return to zero.

It will be evident that the auxiliary burners will be most likely to operate on a humid day or when the refuse being burned is very wet.

The fact that the oxygenating system blows in the air at a substantial distance above the grates, say of the order of 8 feet and directed downwardly at a slight angle of say 15° and with a swirling action, tends to create an effect like a blast furnace which will concentrate the most vigorous combustion relatively high in the charge beneath the arch, and combustion at lower levels can be regulated by damper control of the percentage of air which comes in beneath the grates.

The removal of the fly ash in the vertical upward travel of the flue gases is accomplished by turning the flue gases rearwardly and producing an abrupt downward reverse bend at an angle of the order of 150° while the flue gases are travelling at a speed in excess of 20 miles per hour and preferably of the order of 45 miles per hour. The momentum of the fly ash tends to throw it off downwardly and cause it to enter the tapering hopper and discharge downwardly through the channel to the ash removal conveyor. In the meantime the flue gases take another abrupt upward turn at an angle of the order of 100°, and pass through baffles and, if desired, through a screen to discharge into the atmosphere. In order to encourage discharge of fly ash from the fly ash channel or duct, vibration is suitably used by vibrator $124^3$.

Where it is desired to hold a smouldering charge, for example over a weekend or over a holiday, the charging door can be opened slightly and the blower turned off.

At intervals the structure beneath the grates may become clogged with ash, and in order to clear it the dampener 85 can be closed off to the tuyeres which introduce air above the grate and the pit doors 94 and damper 93 opened. The pressure of the air will then drive the ash out the ash doors 27.

In view of my invention and disclosure, variations and modifications to meet the individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In an incinerator, a primary combustion chamber having side walls, a rear wall and a door at the front, a secondary combustion chamber immediately above the primary combustion chamber, grates at the bottom of the primary combustion chamber, a foraminated refractory arch at the top of the primary combustion chamber separating it from the secondary combustion chamber, a stack above the secondary combustion chamber and communicating therewith, means for introducing air through the side walls and the rear wall of the primary combustion chamber, means for introducing air beneath the grates, auxiliary burner means in the secondary combustion chamber, and means responsive to smoke density variation for turning on said auxiliary burner means in the secondary combustion chamber.

2. An incinerator of claim 1, in combination with time delay means interposed between the means responsive to smoke density variation for turning on the auxiliary burners, and preventing turning on the auxiliary burners means until after a certain time delay.

3. In an incinerator, a primary combustion chamber having side walls, a rear wall and a door at the front, a secondary combustion chamber immediately above the primary combustion chamber, grates at the bottom of the primary combustion chamber, a foraminated refractory arch at the top of the primary combustion chamber separating it from the secondary combustion chamber, a stack above the secondary combustion chamber and communicating therewith, means for introducing air through the side walls and the rear wall of the primary combustion chamber, means for introducing air beneath the grates, auxiliary burner means in the secondary combustion chamber, mechanism responsive to smoke density variation, means actuated by the mechanism responsive to smoke density variation for supplying air beneath the grate, time delay means also actuated by the mechanism responsive to smoke density variation, and means responsive to the time delay means when it times out for turning on said auxiliary burner means in the secondary combustion chamber.

4. In an incinerator, a primary combustion chamber having side walls, a rear wall and a front door to the primary combustion chamber, a refractory arch above the primary combustion chamber having a series of openings therein for passing flue gases, walls forming a secondary combustion chamber above the arch, a stack above and communicating with the secondary combustion chamber, means for blowing air into the primary combustion chamber, a fly ash removal means comprising a first flue rearwardly directed at the top of the stack, a reversely bent downwardly directed second flue connected to said first flue and adapted to throw fly ash radially and downwardly, a hopper beneath said second flue to receive said fly ash, a duct extending downward from the hopper, and a series of baffles above said first flue for receiving flue gas from said second flue which crosses the path of the flue gas in said first flue and discharges to the atmosphere.

5. An incinerator of claim 4, in combination with means for vibrating said fly ash duct.

6. An incinerator of claim 4, in which the flue gas between said first flue and said second flue turns through 150° and in which said flue gas in flowing to said baffles turns through 100°.

7. In an incinerator,
(a) a primary combustion chamber having two side walls, a rear wall, and a front wall comprising a door capable of opening vertically whereby a charge may be horizontally pushed into the primary combustion chamber,
(b) said side walls and rear walls being composed of modules of refractory connected with metallic edge frames,
(c) the combustion chamber being extensible by insertion of additional modules,
(d) a fixed grate at the bottom of the primary combustion chamber,
(e) an arch above the primary combustion chamber having a plurality of openings through which flue gases can pass,
(f) a stack above the arch and communicating with the gases through the arch,
(g) means for introducing air beneath the grate,
(h) tuyeres in the side walls and the rear wall of the combustion chamber, and
(i) means for blowing air through the tuyeres.

8. An incinerator of claim 7, in which the tuyeres are directed angularly through the side walls so as to create a vortex.

9. An incinerator of claim 7, in which said modules comprise metallic structural members of T cross section which extend around the edge of the said modules and refractory extending within the metallic structural members in comolded relation therewith.

10. An incinerator of claim 7, in combination with a metallic shell to which said modules are attached, there being an air gap between said refractory and said metallic shell.

11. In an incinerator, walls forming a primary combustion chamber having side walls, a rear wall, a door forming substantially the front wall capable of opening whereby a charge may be horizontally pushed into the primary combustion chamber, a fixed grate at the bottom of the primary combustion chamber and a foraminated arch above the primary combustion chamber comprising a plurality of groups of beam sections, said beam sections being interconnected laterally within each group, and each group being laterally free from one another.

12. An incinerator of claim 11, in which said arch has common refractory connectors between the ends of a plurality of beams.

13. An incinerator of claim 11, in which the refractory connectors have sockets which receive the ends of the beams of a set.

14. An incinerator of claim 13, in which said sockets are alternately in left hand and right hand relation and said beams of a set are alternately tilted to the right and to the left.

15. An incinerator of claim 12, in combination with metallic hangers connected to certain of the refractory connectors, said hangers being free from tension when the arch is assembled both hot and cold and capable of supporting the connectors during repair of the arch.

References Cited in the file of this patent

UNITED STATES PATENTS

| | | |
|---|---|---|
| 1,035,988 | Miller et al. | Aug. 20, 1912 |
| 1,046,308 | Kitchen | Dec. 3, 1912 |
| 1,285,469 | Tilley | Nov. 19, 1918 |
| 1,528,816 | Cummings | Mar. 10, 1925 |
| 1,866,756 | Deutsch | July 12, 1932 |
| 1,902,063 | Ferris et al. | Mar. 21, 1933 |
| 1,942,947 | Strange | Jan. 9, 1934 |
| 2,074,874 | Vogel | Mar. 23, 1937 |
| 2,144,598 | Brinckerhoff et al. | Jan. 17, 1939 |
| 2,298,757 | Evans | Oct. 13, 1942 |
| 2,659,325 | Honig | Nov. 17, 1953 |
| 2,752,869 | Keenan | July 3, 1956 |
| 2,804,031 | Douglass | Aug. 27, 1957 |
| 2,805,633 | Naulin | Sept. 10, 1957 |
| 2,824,529 | Ries | Feb. 25, 1958 |

FOREIGN PATENTS

| | | |
|---|---|---|
| 279,641 | Germany | Oct. 27, 1914 |